United States Patent
Peng et al.

(10) Patent No.: US 12,021,867 B2
(45) Date of Patent: Jun. 25, 2024

(54) AUTHENTICATION PROCESSING METHOD AND DEVICE, STORAGE MEDIUM, AND ELECTRONIC DEVICE

(71) Applicant: ZTE Corporation, Shenzhen (CN)

(72) Inventors: Jin Peng, Shenzhen (CN); Shilin You, Shenzhen (CN); Zhenhua Xie, Shenzhen (CN); Wantao Yu, Shenzhen (CN); Zhaoji Lin, Shenzhen (CN); Yongqing Qiu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 403 days.

(21) Appl. No.: 17/423,890

(22) PCT Filed: Jan. 19, 2020

(86) PCT No.: PCT/CN2020/072950
§ 371 (c)(1),
(2) Date: Jul. 18, 2021

(87) PCT Pub. No.: WO2020/147856
PCT Pub. Date: Jul. 23, 2020

(65) Prior Publication Data
US 2022/0124092 A1    Apr. 21, 2022

(30) Foreign Application Priority Data
Jan. 18, 2019 (CN) .......................... 201910049058.8

(51) Int. Cl.
*H04L 9/40* (2022.01)
*G06F 11/07* (2006.01)

(52) U.S. Cl.
CPC ...... *H04L 63/0876* (2013.01); *G06F 11/0709* (2013.01); *G06F 11/0793* (2013.01)

(58) Field of Classification Search
CPC ..... H04L 63/0876; H04L 9/12; H04L 9/3242; H04L 9/0838; H04L 63/06;
(Continued)

(56) References Cited

U.S. PATENT DOCUMENTS 9,800,578 B2    10/2017  Wirtanen
2010/0011220 A1*  1/2010  Zhao ............... H04L 9/3271
                                                   726/28
(Continued)

FOREIGN PATENT DOCUMENTS

CN    101102192 A    1/2008
CN    102396203 A    3/2012
(Continued)

OTHER PUBLICATIONS

International Search Report for corresponding application PCT/CN2020/072950 filed Jan. 19, 2020; dated Mar. 19, 2020.
(Continued)

*Primary Examiner* — Henry Tsang
(74) *Attorney, Agent, or Firm* — CANTOR COLBURN LLP

(57) ABSTRACT

Provided are an authentication processing method and device, a storage medium, and an electronic device. The method includes that: a terminal receives an authentication request message from an authentication function; and in cases where authentication on the authentication request message fails, the terminal feeds back an authentication failure message to the authentication function. In cases where the cause of the authentication failure is a Message Authentication Code (MAC) failure and in cases where a cause of authentication failure is a Synchronization (Sync) failure, the terminal feeds back authentication failure messages of the same type to the authentication function.

18 Claims, 5 Drawing Sheets

(58) Field of Classification Search
CPC ............ G06F 11/0709; G06F 11/0793; H04W 12/106; H04W 12/069
See application file for complete search history.

(56) References Cited

U.S. PATENT DOCUMENTS

| | | | | |
|---|---|---|---|---|
| 2010/0266107 | A1* | 10/2010 | Brusilovsky | H04W 76/50 379/46 |
| 2013/0165077 | A1* | 6/2013 | Aalla | H04W 12/12 455/411 |
| 2015/0087269 | A1* | 3/2015 | Lee | H04W 8/20 455/411 |
| 2017/0118203 | A1* | 4/2017 | Wirtanen | H04L 63/0853 |

FOREIGN PATENT DOCUMENTS

| | | |
|---|---|---|
| CN | 108880813 A | 11/2018 |
| EP | 3163927 A1 | 5/2017 |
| WO | 2018230974 A1 | 12/2018 |

OTHER PUBLICATIONS

3GPP TSG SA WG2 Meeting #83, Salt Lake City, Utah, USA, Feb. 21-25, 2011, S2-110831.
3GPP TSG-CT WG1 Meeting #111bis, Sophia Antipolis (France, Jul. 9-13, 2018, C1-184163.
European Search Report for corresponding application EP20741108; Report dated Feb. 22, 2022.

\* cited by examiner

AUTHENTICATION PROCESSING METHOD AND DEVICE, STORAGE MEDIUM, AND ELECTRONIC DEVICE

CROSS-REFERENCE TO RELATED APPLICATION

The present application is a national stage filing of PCT International Application No. PCT/CN2020/072950 filed on Jan. 19, 2020, which claims priority to Chinese Patent Application No. 201910049058.8, filed to the China National Intellectual Property Administration on Jan. 18, 2019, the disclosure of which is hereby incorporated by reference in its entirety.

TECHNICAL FIELD

The present application relates to the technical field of communications, for example, to an authentication processing method and device, a storage medium, and an electronic device.

BACKGROUND

The 3rd Generation Partnership Project (3GPP) regulates specifications for various mobile networks, including an Authentication and Key Agreement (AKA) procedure. This procedure is used for a terminal (for example, User Equipment (UE)) and a network to authenticate each other and establish a common key.

In the AKA procedure, when receiving an authentication request message from the network, the terminal verifies the authentication request message. If the verification fails, the terminal replies with an authentication failure message, which carries a failure cause parameter (CAUSE). If the authentication request message is not a valid authentication request message for the terminal, the cause of failure is a Message Authentication Code (MAC) failure. If the authentication request message is a valid authentication request message for the terminal, but the authentication request message is a replayed message and thus has been verified by the terminal, the cause of failure is a Synchronization (Sync) failure.

Under such an authentication mechanism, if an attacker replays a valid authentication request message, receives the authentication failure message replied by the terminal, and analyzes the cause of failure in the authentication failure message, the attacker can identify the terminal to which the authentication request message is directed and thus can determine whether the terminal is located in a certain area. By replaying the authentication request message multiple times and receiving and analyzing the authentication failure message, the attacker realizes the tracking of a user, and may use the tracking result to further attack the user's privacy.

There are no effective solutions for the above problems in the related art.

SUMMARY

Embodiments of the present application provide an authentication processing method and device, a storage medium, and an electronic device, which may at least solve the problem in the related art that under an AKA authentication mechanism, the tracking of a terminal can be realized by replaying a valid authentication request message multiple times.

According to an embodiment of the present application, an authentication processing method is provided, which may include that: a terminal receives an authentication request message from an authentication function; and in cases where authentication on the authentication request message fails, the terminal feeds back an authentication failure message to the authentication function. In cases where a cause of authentication failure is a MAC failure and in cases where a cause of authentication failure is a Sync failure, the terminal feeds back authentication failure messages of the same type to the authentication function.

According to another embodiment of the present application, an authentication processing method is provided, which may include that: an authentication function receives an authentication failure message fed back by a terminal, wherein in cases where a cause of authentication failure is a MAC failure and in cases where a cause of authentication failure is a Sync failure, authentication failure messages received by the authentication function all carry a synchronization failure parameter; the authentication function sends an authentication request message to a home network entity, wherein the authentication request message carries the synchronization failure parameter; and the authentication function receives a cause of failure returned by the home network entity according to the synchronization failure parameter.

According to another embodiment of the present application, an authentication processing method is provided, which may include: a home network entity receives an authentication request message from an authentication function, wherein the authentication request message carries a synchronization failure parameter generated in cases where a MAC failure or a Sync failure occurs while a terminal performs authentication; the home network entity determines a cause of failure according to the synchronization failure parameter; and the home network entity returns the cause of failure to the authentication function.

According to another embodiment of the present application, an authentication processing device is provided, which is applied to a terminal and may include: a receiving module, configured to receive an authentication request message from an authentication function; and a feedback module, configured to feed back, in cases where authentication on the authentication request message fails, an authentication failure message to the authentication function. In cases where a cause of authentication failure is a MAC failure and in cases where a cause of authentication failure is a Sync failure, the feedback module is configured to feed back authentication failure messages of the same type to the authentication function.

According to another embodiment of the present application, an authentication processing device is provided, which is applied to an authentication function and may include: a first receiving module, configured to receive an authentication failure message fed back by a terminal, wherein in cases where a cause of authentication failure is a MAC failure and in cases where a cause of authentication failure is a Sync failure, authentication failure messages received by the first receiving module all carry a synchronization failure parameter; a sending module, configured to send an authentication request message to a home network entity, wherein the authentication request message carries the synchronization failure parameter; and a second receiving module, configured to receive a cause of failure returned by the home network entity according to the synchronization failure parameter.

According to another embodiment of the present application, an authentication processing device is provided, which is applied to a home network entity and may include: a receiving module, configured to receive an authentication request message from an authentication function, wherein the authentication request message carries a synchronization failure parameter generated in cases where a MAC failure or a Sync failure occurs while a terminal performs authentication; a determining module, configured to determine a cause of failure according to the synchronization failure parameter; and a sending module, configured to return the cause of failure to the authentication function.

According to yet another embodiment of the present application, a storage medium is provided. The storage medium stores a computer program. The computer program is configured to execute, at runtime, operations in any above method embodiment.

According to yet another embodiment of the present application, an electronic device is provided, which includes a memory and a processor. The memory stores a computer program. The processor is configured to run the computer program, so as to perform operations in any of the above method embodiments.

Through the embodiments of the present application, after an authentication request message is received from an authentication function, an authentication failure message of the same type is fed back regardless of whether the cause of the authentication failure is the MAC failure or the Sync failure, and this way of fuzzing the authentication failure message can effectively hide failure information (including the cause of failure and/or the synchronization failure parameter), so as to prevent the attacker from getting enough real synchronization failure information to track the user. The scheme can solve the problem in the related art that under the AKA authentication mechanism, the tracking of a terminal can be realized by replaying a valid authentication request message multiple times, thereby effectively improving the security and confidentiality of the authentication procedure.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings.

DETAILED DESCRIPTION

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

First Embodiment

Figure 1:
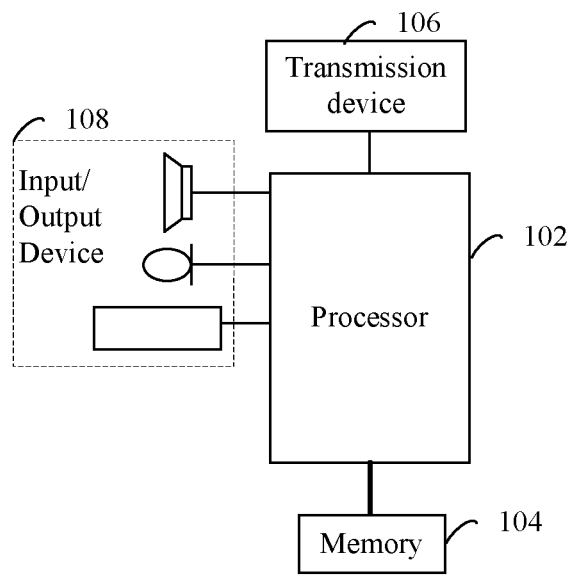
FIG. 1 is a structural block diagram of hardware of a mobile terminal for implementing an authentication processing method according to an embodiment of the present application.

The method embodiment provided in the first embodiment may be performed in terminals (including a mobile terminal, a computer terminal or similar operating devices). By taking that the method is performed on the mobile terminal, FIG. 1 is a structural block diagram of hardware of a mobile terminal for implementing an authentication processing method according to an embodiment of the present application. As shown in FIG. 1, the mobile terminal 10 may include one or more (only one is shown in FIG. 1) processors 102 (the processors 102 may include, but not limited to, a Micro Processor Unit (MCU) or a Field Programmable Gate Array (FPGA), and other processing devices), a memory 104 configured to store data. In some exemplary implementations, the mobile terminal may further include a transmission device 106 with a communication function and an input/output device 108. Those having ordinary skill in the art should know that the structure shown in FIG. 1 is only schematic and not intended to limit the structure of the mobile terminal. For example, the mobile terminal 10 may also include more or fewer components than that in FIG. 1, or have a configuration different from that in FIG. 1.

The memory 104 may be configured to store a computer program, for example, a software program and module of application software, for example, a computer program corresponding to the authentication processing method in the embodiments of the present application. The processor 102 runs the computer program stored in the memory 104, thereby executing various functional applications and data processing, namely implementing the above method. The memory 104 may include a high-speed random access memory and may also include a nonvolatile memory, for example, one or more magnetic storage devices, flash memories or other nonvolatile solid-state memories. In some examples, the memories 104 may further include memories remotely set relative to the processor 102, and these remote memories may be connected to the mobile terminal 10 through the network. An example of the network includes, but not limited to, the Internet, an Intranet, a local area network, a mobile communication network and a combination thereof.

The transmission device 106 is configured to receive or send data through a network. A specific example of the network may include a wireless network provided by a communication provider of the mobile terminal 10. In an example, the transmission device 106 includes a Network Interface Controller (NIC), which may be connected with other network devices through a base station, thereby communicating with the Internet. In an example, the transmission device 106 may be a Radio Frequency (RF) module, which is configured to communicate with the Internet in a wireless manner.

Figure 2:
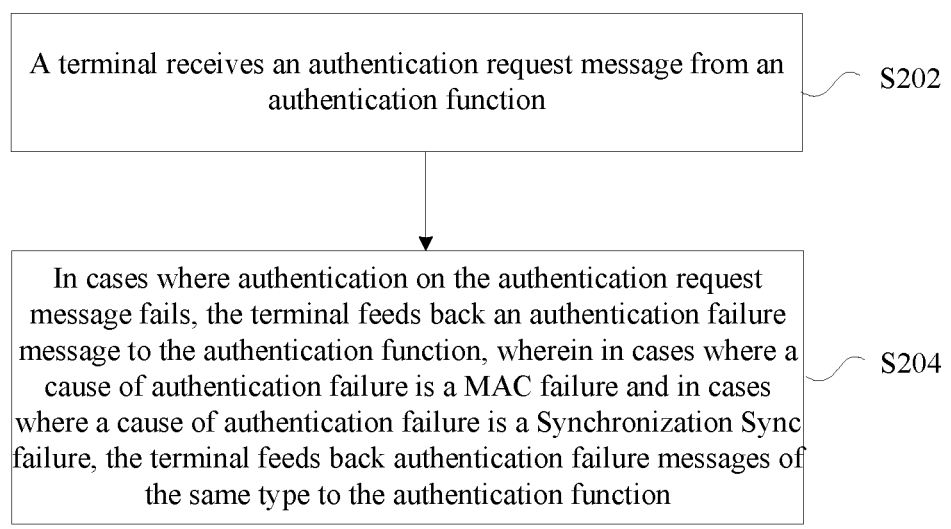
FIG. 2 is a flowchart of an authentication processing method according to a first embodiment of the present application.

In the present embodiment, an authentication processing performed by a terminal is provided. FIG. 2 is a flowchart of an authentication processing method according to the first embodiment of the present application. As shown in FIG. 2, the flow includes the following operations.

At S202, a terminal receives an authentication request message from an authentication function.

At S204, in cases where authentication on the authentication request message fails, the terminal feeds back an authentication failure message to the authentication function, wherein in cases where a cause of authentication failure is a MAC failure and in cases where a cause of authentication failure is a Synchronization Sync failure, the terminal feeds back authentication failure messages of the same type to the authentication function.

In some exemplary implementations, the device executing the above operations may be a terminal, including but not limited to, a mobile terminal, a computer terminal or similar computing devices, etc.

Through the present embodiment, after an authentication request message is received from an authentication function, an authentication failure message of the same type is fed back regardless of whether the cause of the authentication failure is the MAC failure or the Sync failure, and this way of fuzzing the authentication failure message can effectively hide failure information (including the cause of failure and/or a synchronization failure parameter), so as to prevent the attacker from getting enough real synchronization failure information to track the user. The scheme can solve the problem in the related art that under the AKA authentication mechanism, the tracking of a terminal can be realized by replaying a valid authentication request message multiple times, thereby effectively improving the security and confidentiality of the authentication procedure.

Considering that the attacker usually wangles the authentication failure message by replaying a valid authentication request message to obtain synchronization failure information (including the cause of synchronization failure and/or the synchronization failure parameter) carried in the authentication failure message, the present embodiment adopts the way of fuzzing the authentication failure message to make it impossible for the attacker to identify a valid authentication failure message. The means of fuzzing the authentication failure message may include: fuzzing a failure cause parameter in the authentication failure message, or fuzzing the synchronization failure parameter included in the authentication failure message, or fuzzing both of them.

As an exemplary embodiment, in cases where the cause of the authentication failure is the MAC failure and in cases where the cause of the authentication failure is the Sync failure, the terminal feeds back the authentication failure messages of the same type to the authentication function in the following manner. In cases where the cause of the authentication failure is the MAC failure and in cases where the cause of the authentication failure is the Sync failure, the authentication failure messages do not carry the failure cause parameter, or all carry the same failure cause parameter.

As an exemplary embodiment, the authentication failure messages all carry the same failure cause parameter, which may be implemented in one of the following manners: the authentication failure messages all carry the failure cause parameter which is set to null or has a same preset padding value; the authentication failure messages all carry the failure cause parameter which is MAC or Sync Failure; or the authentication failure messages all carry the failure cause parameter which is Sync Failure.

As an exemplary embodiment, in cases where the cause of the authentication failure is the MAC failure and in cases where the cause of the authentication failure is the Sync failure, the terminal feeds back the authentication failure messages of the same type to the authentication function in the following manner. In cases where the cause of the authentication failure is the MAC failure and in cases where the cause of the authentication failure is the Sync failure, the authentication failure messages all carry the same failure cause parameter.

As an exemplary embodiment, in cases where the cause of the authentication failure is the Sync failure, the synchronization failure parameter is calculated by the terminal according to the authentication request message; and in cases where the cause of the authentication failure is the MAC failure, the synchronization failure parameter is randomly generated by the terminal, or is a predetermined value, or is calculated by the terminal according to the authentication request message. In order to prevent the attacker from distinguishing the cause of failure truly indicated by the authentication failure message and/or telling the authenticity of the synchronization failure parameter from differences in performance details of the synchronization failure parameters, as an exemplary implementation, the data length of the synchronization failure parameter randomly generated by the terminal or the predetermined value is the same as the data length of the synchronization failure parameter calculated by the terminal according to the authentication request message.

Second Embodiment

Figure 3:
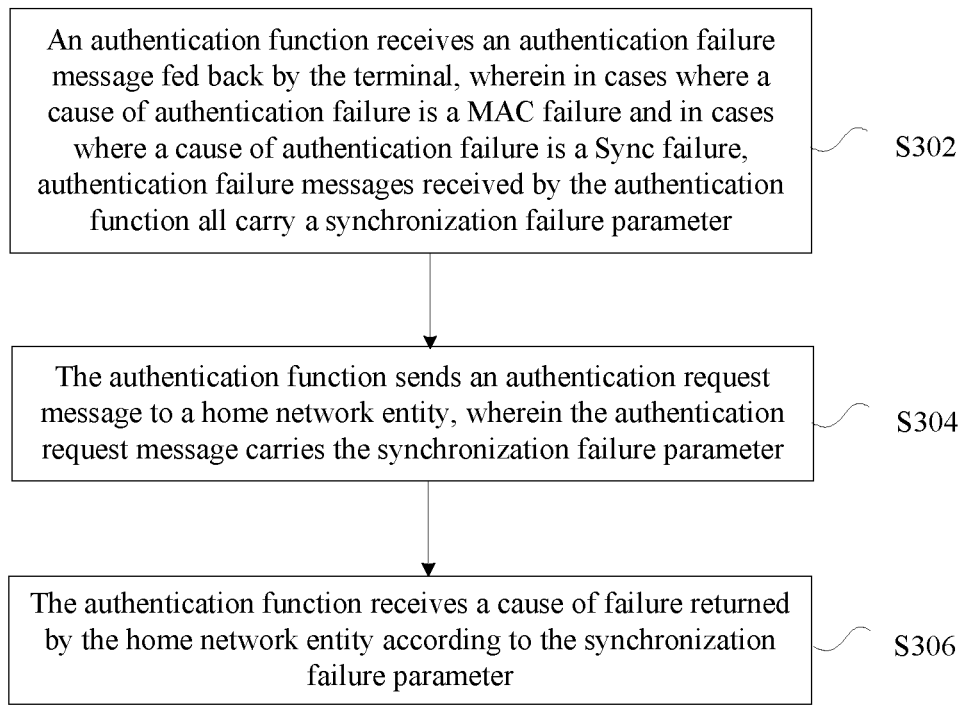
FIG. 3 is a flowchart of an authentication processing method according to a second embodiment of the present application.

In the present embodiment, an authentication processing method is provided, which may be performed by an authentication function. FIG. 3 is a flowchart of an authentication processing method according to the second embodiment of the present application. As shown in FIG. 3, the flow includes the following operations.

At S302, an authentication function receives an authentication failure message fed back by a terminal, wherein in cases where a cause of authentication failure is a MAC failure and in cases where a cause of authentication failure is a Sync failure, authentication failure messages received by the authentication function all carry a synchronization failure parameter.

At S304, the authentication function sends an authentication request message to a home network entity, wherein the authentication request message carries the synchronization failure parameter.

At S306, the authentication function receives a cause of failure returned by the home network entity according to the synchronization failure parameter.

Through the present embodiment, after receiving the fuzzed authentication failure message, the authentication function sends the synchronization failure parameter carried in the received authentication failure message to the home network entity, and receives the cause of failure returned by the home network entity, so that the authentication function can then perform the corresponding authentication processing according to the cause of failure. The scheme fuzzes the authentication failure message between the terminal and the authentication function, thereby effectively hiding the failure information (including the cause of failure and/or the synchronization failure parameter), so as to prevent the attacker from getting enough real synchronization failure information to track the user. The scheme can solve the problem in the related art that under the AKA authentication mechanism, the tracking of a terminal can be realized by replaying a valid authentication request message multiple times, thereby effectively improving the security and confidentiality of the authentication procedure.

As an exemplary embodiment, in cases where the cause of the authentication failure is the MAC failure and in cases where the cause of the authentication failure is the Sync failure, the authentication failure messages received by the authentication function do not carry the failure cause parameter, or all carry the same failure cause parameter.

As an exemplary embodiment, the authentication failure messages received by the authentication function all carry the same failure cause parameter, which may be implemented by one of the following manners: the authentication failure messages all carry the failure cause parameter which is set to null or has a same preset padding value; the authentication failure messages all carry the failure cause parameter which is MAC or Sync Failure; or the authentication failure messages all carry the failure cause parameter which is Sync Failure.

As an exemplary embodiment, the method may further include an operation that the authentication function adds a predetermined failure indicator to the authentication request message, wherein the predetermined failure indicator includes one of the following: Sync Failure Indicator and MAC or Sync Failure Indicator. When receiving the predetermined failure indicator, the home network entity determines the specific cause of authentication failure on the terminal and notifies the authentication function of the determined cause of authentication failure, so that the authentication function can perform the corresponding authentication processing according to the specific cause of failure.

As an exemplary embodiment, before S306, the method may further include the following operation.

At S308, the authentication function performs authentication processing according to the cause of failure returned by the home network entity. The specific authentication processing as an embodiment may be performed as described below.

If the cause of failure "CAUSE" is the MAC failure "MAC Failure", the authentication function can terminate the authentication procedure, or send a terminal identity request message to the terminal, or initiate the authentication procedure for the terminal again.

If the cause of failure "CAUSE" is the Sync failure "Sync Failure", the authentication function initiates the authentication procedure for the terminal again.

Third Embodiment

Figure 4:
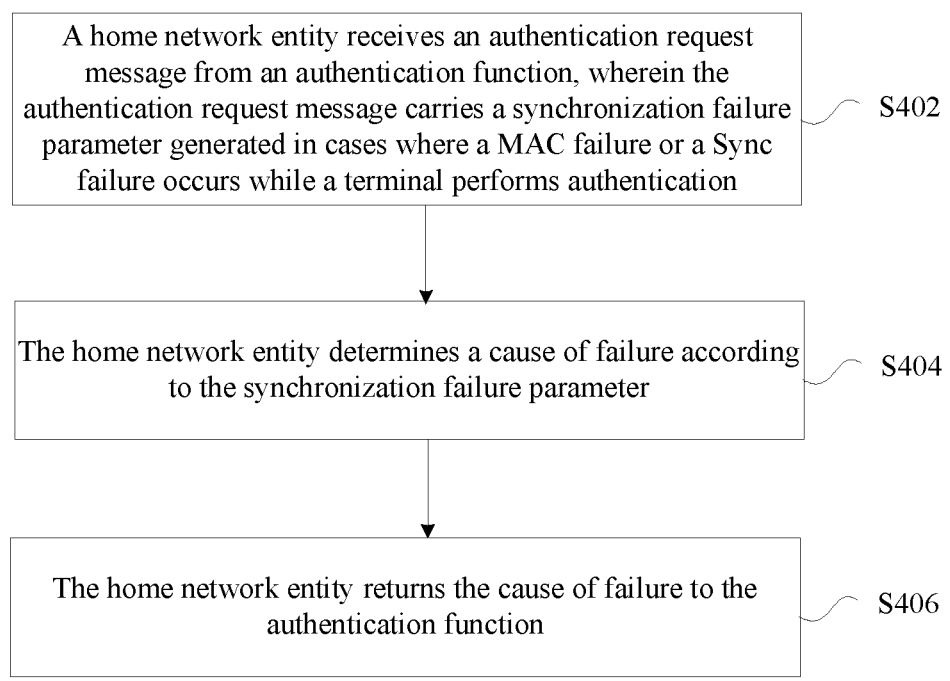
FIG. 4 is a flowchart of an authentication processing method according to a third embodiment of the present application.

In the present embodiment, an authentication processing method is provided, which may be performed by a home network entity. FIG. 4 is a flowchart of an authentication processing method according to the third embodiment of the present application. As shown in FIG. 4, the flow includes the following operations.

At S402, a home network entity receives an authentication request message from an authentication function, wherein the authentication request message carries a synchronization failure parameter generated in cases where a MAC failure or a Sync failure occurs while a terminal performs authentication.

At S404, the home network entity determines a cause of failure according to the synchronization failure parameter.

At S406, the home network entity returns the cause of failure to the authentication function.

Through the present embodiment, after receiving the authentication request message from the authentication function, the home network entity determines the real cause of failure according to the synchronization failure parameter carried in the authentication failure message, and returns the cause of failure to the authentication function. Because the communication between the authentication function and the home network entity belongs to the internal communication of a network system, controlling the determination and transmission of the cause of failure within the network system can effectively hide the failure information (including the cause of failure and/or the synchronization failure parameter), so as to prevent the attacker from getting enough real synchronization failure information to track the user. The scheme can solve the problem in the related art that under the AKA authentication mechanism, the tracking of a terminal can be realized by replaying a valid authentication request message multiple times, thereby effectively improving the security and confidentiality of the authentication procedure.

As an exemplary embodiment, the operation that the home network entity determines the cause of failure according to the synchronization failure parameter may be implemented in the following manner.

The home network entity verifies validity of the synchronization failure parameter.

In cases where the synchronization failure parameter is verified invalid, it is determined that the cause of failure is the MAC failure. In the present embodiment, the synchronization failure parameter may be AUTS, and in a case where verification, at a home network, on MAC-S in the AUTS fails (that is, the AUTS is identified invalid), it may be determined that the cause of failure of the terminal is the MAC failure. In some schemes described above, when the terminal generates the MAC failure, a random number or a predetermined value is filled into the AUTS, and after the AUTS is sent to the home network, the random number or the predetermined value in the AUTS surely cannot pass the message verification at the home network. Therefore, the home network can determine that the cause of failure of the terminal is the MAC failure by the failure in verifying the MAC-S in the AUTS. In the other part of the schemes described above, when the terminal generates the MAC failure, the value calculated according to the authentication request message is filled into the AUTS, in such a case the AUTS can pass the message verification at the home network, and then whether the specific cause of failure is the MAC failure or the Sync failure can be further determined by using the following method for determining the cause of failure based on a sequence number in cases where the synchronization failure parameter is verified valid.

In cases where the synchronization failure parameter is verified valid, the home network entity calculates a sequence number $SQN_{MS}$ of the terminal according to the synchronization failure parameter, and determines the cause of failure according to the sequence number $SQN_{MS}$ of the terminal and a sequence number $SQN_{HE}$ of the home network entity.

As an exemplary embodiment, the operation that the home network entity determines the cause of failure according to the sequence number $SQN_{MS}$ of the terminal and the sequence number $SQN_{HE}$ of the home network entity may be implemented in at least one of the following manners: in cases where the $SQN_{MS}$ is greater than or equal to the $SQN_{HE}$, the home network entity determines that the cause of failure is the Sync failure; and in cases where the $SQN_{MS}$ is less than the $SQN_{HE}$, the home network entity determines that the cause of failure is the MAC failure.

Through the above description of implementation modes, those skilled in the art may clearly know that the method according to the above embodiments 1 to 3 may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

Fourth Embodiment

In the present embodiment, an authentication processing device is provided. The device is configured to implement the above first embodiment and exemplary implementations. The embodiments and preferred implementations which have been elaborated will not be repeated here. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 5:
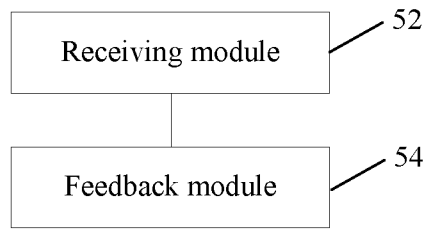
FIG. 5 is a structural block diagram of an authentication processing device according to a fourth embodiment of the present application.

FIG. 5 is a structural block diagram of an authentication processing device according to a fourth embodiment of the present application. As shown in FIG. 5, the device is applied to a terminal, and may include: a receiving module 52, configured to receive an authentication request message from an authentication function; and a feedback module 54, configured to feed back, in cases where authentication on the authentication request message fails, an authentication failure message to the authentication function. In cases where a cause of authentication failure is a MAC failure and in cases where a cause of authentication failure is a Sync failure, the feedback module 54 is configured to feed back authentication failure messages of the same type to the authentication function.

Through the present embodiment, after an authentication request message is received from an authentication function, an authentication failure message of the same type is fed back regardless of whether the cause of the authentication failure is the MAC failure or the Sync failure, and this way of fuzzing the authentication failure message can effectively hide failure information (including the cause of failure and/or the synchronization failure parameter), so as to prevent the attacker from getting enough real synchronization failure information to track the user. The scheme can solve the problem in the related art that under the AKA authentication mechanism, the tracking of a terminal can be realized by replaying a valid authentication request message multiple times, thereby effectively improving the security and confidentiality of the authentication procedure.

As an exemplary embodiment, in cases where the cause of the authentication failure is the MAC failure and in cases where the cause of the authentication failure is the Sync failure, the authentication failure messages do not carry the failure cause parameter, or all carry the same failure cause parameter.

As an exemplary embodiment, in cases where the cause of the authentication failure is the MAC failure and in cases where the cause of the authentication failure is the Sync failure, the authentication failure messages all carry the synchronization failure parameter.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Fifth Embodiment

In the present embodiment, an authentication processing device is provided. The device is configured to implement the above second embodiment and exemplary implementations. The embodiments and preferred implementations which have been elaborated will not be repeated here. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 6:
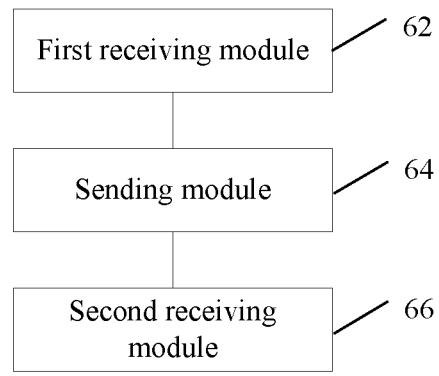
FIG. 6 is a structural block diagram of an authentication processing device according to a fifth embodiment of the present application.

FIG. 6 is a structural block diagram of an authentication processing device according to a fifth embodiment of the present application. As shown in FIG. 6, the device is applied to an authentication function, and may include: a first receiving module 62, configured to receive an authentication failure message fed back by a terminal, wherein in cases where a cause of authentication failure is a MAC failure and in cases where a cause of authentication failure is a Sync failure, authentication failure messages received by the first receiving module 62 all carry a synchronization failure parameter; a sending module 64, configured to send an authentication request message to a home network entity, wherein the authentication request message carries the synchronization failure parameter; and a second receiving module 66, configured to receive a cause of failure returned by the home network entity according to the synchronization failure parameter.

As an exemplary implementation, the device may further include: a performing module, configured to perform the authentication processing according to the cause of failure returned by the home network entity.

Through the present embodiment, after receiving the fuzzed authentication failure message, the authentication function sends the synchronization failure parameter carried in the received authentication failure message to the home network entity, and receives the cause of failure returned by the home network entity, so that the authentication function can then perform the corresponding authentication processing according to the cause of failure. The scheme fuzzes the authentication failure message between the terminal and the authentication function, thereby effectively hiding the failure information (including the cause of failure and/or the synchronization failure parameter), so as to prevent the attacker from getting enough real synchronization failure information to track the user. The scheme can solve the problem in the related art that under the AKA authentication mechanism, the tracking of a terminal can be realized by replaying a valid authentication request message multiple times, thereby effectively improving the security and confidentiality of the authentication procedure.

As an exemplary embodiment, the sending module 64 is further configured to add a predetermined failure indicator to the authentication request message, wherein the predetermined failure indicator includes one of the following: Sync Failure Indicator and MAC or Sync Failure Indicator.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Sixth Embodiment

In the present embodiment, an authentication processing device is provided. The device is configured to implement the above third embodiment and exemplary implementations. The embodiments and preferred implementations which have been elaborated will not be repeated here. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 7:
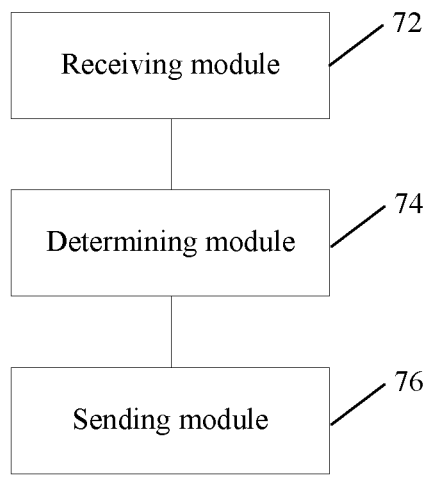
FIG. 7 is a structural block diagram of an authentication processing device according to a sixth embodiment of the present application.

FIG. 7 is a structural block diagram of an authentication processing device according to a sixth embodiment of the present application. As shown in FIG. 7, the device is applied to a home network entity, and may include: a receiving module 72, configured to receive an authentication request message from an authentication function, wherein the authentication request message carries a synchronization failure parameter generated in cases where a MAC failure or a Sync failure occurs while a terminal performs authentication; a determining module 74, configured to determine a cause of failure according to the synchronization failure parameter; and a sending module 76, configured to return the cause of failure to the authentication function.

Through the present embodiment, after receiving the authentication request message from the authentication function, the home network entity determines the real cause of failure according to the synchronization failure parameter carried in the authentication failure message, and returns the cause of failure to the authentication function. Because the communication between the authentication function and the home network entity belongs to the internal communication of a network system, controlling the determination and transmission of the cause of failure within the network system can effectively hide the failure information (including the cause of failure and/or the synchronization failure parameter), so as to prevent the attacker from getting enough real synchronization failure information to track the user. The scheme can solve the problem in the related art that under the AKA authentication mechanism, the tracking of a terminal can be realized by replaying a valid authentication request message multiple times, thereby effectively improving the security and confidentiality of the authentication procedure.

As an exemplary embodiment, the determining module 74 is configured to calculate a sequence number $SQN_{MS}$ of the terminal according to the synchronization failure parameter, and determine the cause of failure according to the sequence number $SQN_{MS}$ of the terminal and a sequence number $SQN_{HE}$ of the home network entity.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Seventh Embodiment

The embodiment of the present application provides a storage medium. The storage medium stores a computer program. The computer program is configured to execute, at runtime, the operations in any of the above method embodiments.

In some exemplary implementations of the present embodiment, the storage medium may be configured to store a computer program for executing the following operations.

At S1, an authentication request message is received from an authentication function.

At S2, in cases where authentication on the authentication request message fails, an authentication failure message is fed back to the authentication function, wherein in cases where a cause of authentication failure is a MAC failure and in cases where a cause of authentication failure is a Sync failure, a terminal feeds back the authentication failure messages of the same type to the authentication function.

In some exemplary implementations of the present embodiment, the storage media include, but not limited to, a USB flash disk, a Read-Only Memory (ROM), a Random Access Memory (RAM), a mobile hard disk, a magnetic disk, a compact disc, and other media capable of storing the computer program.

The embodiment of the present application provides an electronic device, which includes a memory and a processor. The memory stores a computer program. The processor is configured to run the computer program to execute the operations in any of the above method embodiments.

In some exemplary implementations, the electronic device may further include a transmission device and an input/output device. The transmission device is connected with the processor, and the input/output device is connected with the processor.

In some exemplary implementations of the present embodiment, the processor may be configured to execute the following operations through the computer program.

At S1, an authentication request message is received from an authentication function.

At S2, in cases where authentication on the authentication request message fails, an authentication failure message is fed back to the authentication function, wherein in cases where a cause of authentication failure is a MAC failure and in cases where a cause of authentication failure is a Sync failure, the terminal feeds back the authentication failure messages of the same type to the authentication function.

Optionally, the specific examples in the present embodiment may refer to the examples described in the above embodiments and exemplary embodiments.

Eighth Embodiment

The embodiment of the present application provides a storage medium. The storage medium stores a computer program. The computer program is configured to execute, at runtime, the operations in any of the above method embodiments.

In some exemplary implementations of the present embodiment, the storage medium may be configured to store a computer program for executing the following operations.

At S1, an authentication failure message fed back by a terminal is received, wherein in cases where a cause of authentication failure is a MAC failure and in cases where a cause of authentication failure is a Sync failure, authentication failure messages received by the authentication function all carry a synchronization failure parameter.

At S2, an authentication request message is sent to a home network entity, wherein the authentication request message carries the synchronization failure parameter.

At S3, a cause of failure returned by the home network entity according to the synchronization failure parameter is received.

In some exemplary implementations of the present embodiment, the storage media include, but not limited to, a USB flash disk, a Read-Only Memory (ROM), a Random Access Memory (RAM), a mobile hard disk, a magnetic disk, a compact disc, and other media capable of storing the computer program.

The embodiment of the present application provides an electronic device, which includes a memory and a processor. The memory stores a computer program. The processor is configured to run the computer program to execute the operations in any of the above method embodiments.

In some exemplary implementations, the electronic device may further include a transmission device and an input/output device. The transmission device is connected with the processor, and the input/output device is connected with the processor.

In some exemplary implementations of the present embodiment, the processor may be configured to execute the following operations through the computer program.

At S1, an authentication failure message fed back by a terminal is received, wherein in cases where a cause of authentication failure is a MAC failure and in cases where a cause of authentication failure is a Sync failure, authentication failure messages received by the authentication function all carry a synchronization failure parameter.

At S2, an authentication request message is sent to a home network entity, wherein the authentication request message carries the synchronization failure parameter.

At S3, a cause of failure returned by the home network entity according to the synchronization failure parameter is received.

Optionally, the specific examples in the present embodiment may refer to the examples described in the above embodiments and exemplary embodiments.

Ninth Embodiment

The embodiment of the present application provides a storage medium. The storage medium stores a computer program. The computer program is configured to execute, at runtime, the operations in any of the above method embodiments.

In some exemplary implementations of the present embodiment, the storage medium may be configured to store a computer program for executing the following operations.

At S1, an authentication request message is received from an authentication function, wherein the authentication request message carries a synchronization failure parameter generated in cases where a MAC failure or a Sync failure occurs while a terminal performs authentication.

At S2, a cause of failure is determined according to the synchronization failure parameter.

At S3, the cause of failure is returned to the authentication function.

In some exemplary implementations of the present embodiment, the storage media include, but not limited to, a USB flash disk, a Read-Only Memory (ROM), a Random Access Memory (RAM), a mobile hard disk, a magnetic disk, a compact disc, and other media capable of storing the computer program.

The embodiment of the present application provides an electronic device, which includes a memory and a processor. The memory stores a computer program. The processor is configured to run the computer program to execute the operations in any of the above method embodiments.

In some exemplary implementations, the electronic device may further include a transmission device and an input/output device. The transmission device is connected with the processor, and the input/output device is connected with the processor.

In some exemplary implementations of the present embodiment, the processor may be configured to execute the following operations through the computer program.

At S1, an authentication request message is received from an authentication function, wherein the authentication request message carries a synchronization failure parameter generated in cases where a MAC failure or a Sync failure occurs while a terminal performs authentication.

At S2, a cause of failure is determined according to the synchronization failure parameter.

At S3, the cause of failure is returned to the authentication function.

Optionally, the specific examples in the present embodiment may refer to the examples described in the above embodiments and exemplary embodiments.

Tenth Embodiment

Figure 8:
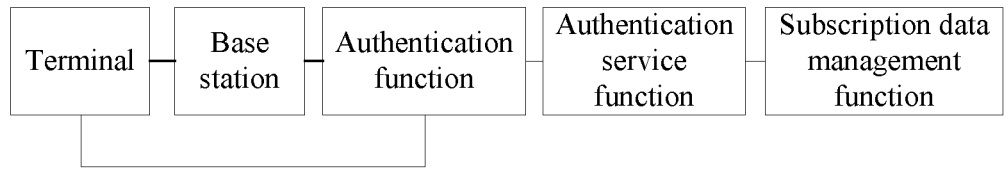
FIG. 8 is a structure diagram of a mobile system according to a tenth embodiment of the present application.

FIG. 8 is a structure diagram of a mobile system according to the tenth embodiment of the present application. As shown in FIG. 8, network elements related to an authentication and key agreement procedure of the mobile system include: a terminal, a base station, an authentication function, an authentication service function and a subscription data management function. These network elements are described in detail below.

The base station provides the terminal with various services, such as communication, provided by the mobile network. In a real system, the base station may be an access network element, such as eNB or gNB, which can provide communication services.

The authentication function is a software function or a hardware device of a core network of the mobile network, and is used for performing signaling interacting with the base station to enable the mobile network and the terminal to realize mutual authentication. In the real system, the authentication function may be or can be set in the network elements, such as a Mobility Management Entity (MME), or a Security Anchor Function (SEAF), or an Access and Mobility Management Function (AMF).

The authentication service function is used for obtaining key information related to the user from the subscription data management function via a signaling interface, and providing the information to the authentication function via a signaling interface. In the real system, the authentication service function may be or may be set in the network elements, such as an Authentication Server Function (AUSF). This function may also be combined with the subscription data management function.

The subscription data management function is used for storing and processing data related to the user, generating information for authenticating the user and the key information related to the user based on the data related to the user, and providing the information to the authentication service function via a signaling interface. In the real system, the subscription data management function may be or may be set in the network elements, such as a User Date Management (UDM) or a Home Subscriber Server (HSS).

Figure 9:
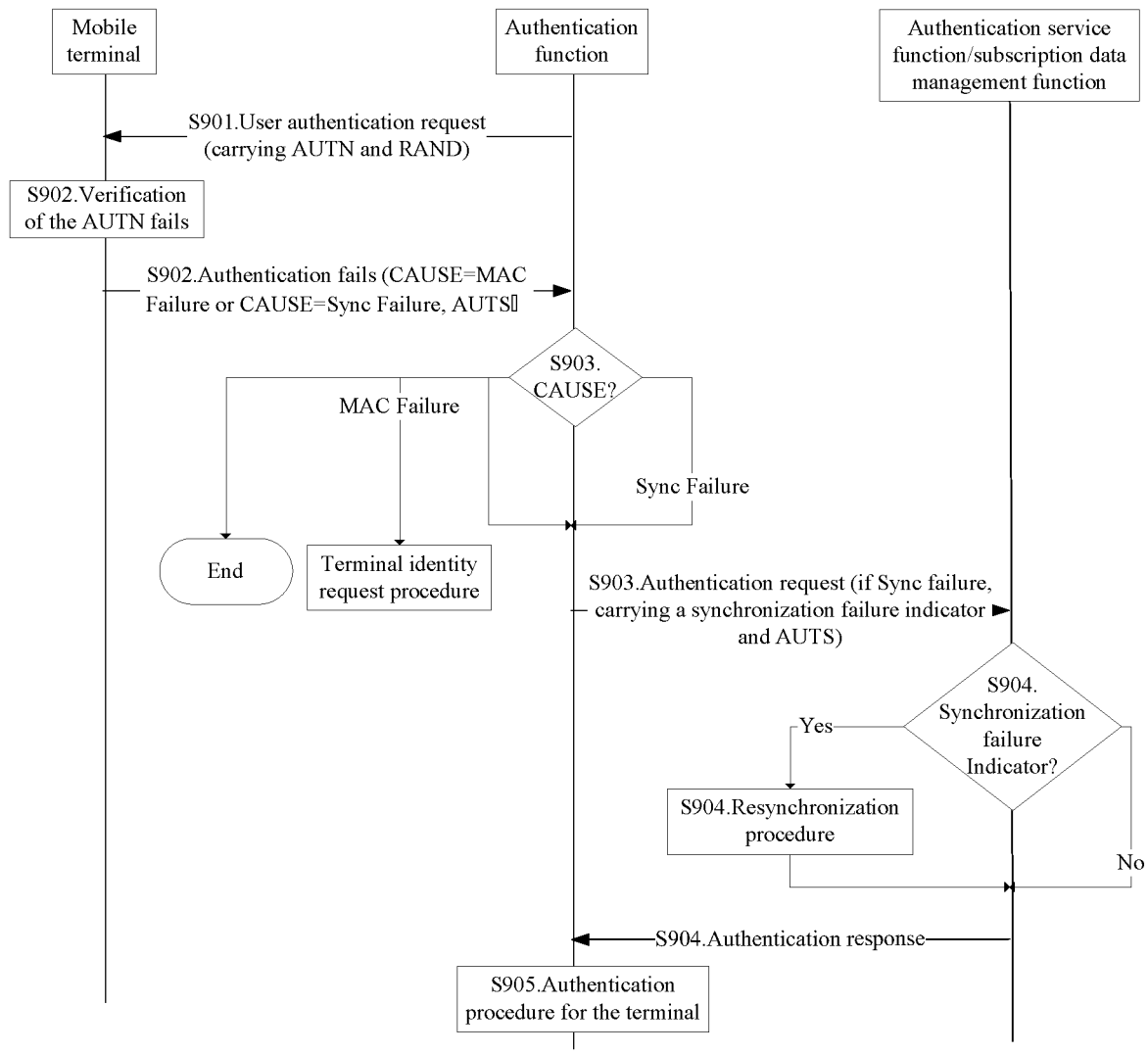
FIG. 9 is a flowchart of a terminal responding with an authentication failure message in AKA authentication of the 5G technology according to a tenth embodiment of the present application.

An AKA authentication technology may be applied to various communication networks. Taking the application in the 5th Generation (5G) mobile communication network as an example, the whole AKA authentication procedure is described briefly below. FIG. 9 is a flowchart of a terminal responding with an authentication failure message in AKA authentication of the 5G technology according to the tenth embodiment of the present application. As shown in FIG. 9, the specific operations are as follows.

At S901, the authentication function sends a user authentication request message to the terminal, the user authentication request message carrying AUTN and RAND. Here, AUTN is an authentication token parameter, AUTN= $(SQN \oplus AK) \| AMF \| MAC$, $\|$ represents a splicing operation, for example, $0011 \| 1111 = 00111111$, SQN represents the sequence number, AK represents an anonymity key, AMF represents an authentication management field, MAC represents a message authenticate code, and RAND is a random number parameter.

The message may further carry a key set identifier in 5G (referred to as ngKSI).

At S902, the terminal receives the user authentication request message, calculates $AK = F5K(RAND)$, and thus calculates $SQN = (SQN \oplus AK \oplus AK)$. Then, the terminal calculates $XMAC = F1K(SQN \| RAND \| AMF)$, and compares XMAC with MAC in AUTN.

If the XMAC and the MAC are different, the terminal replies with an authentication failure message, the authentication failure message carrying a failure cause parameter "CAUSE" which is "MAC Failure". In particular, the message does not carry the synchronization failure parameter, i.e., an Authentication Token (referred to as AUTS) parameter.

If the)(MAC and the MAC are the same, the terminal verifies whether the value of SQN in the AUTN is in a correct range. In particular, if the SQN in the AUTN is greater than the SQN ($SQN_{MS}$) of the terminal, it is considered that the value is in the correct range; and if the SQN in the AUTN is less than or equal to the SQN ($SQN_{MS}$) of the terminal, it is considered that the value is not in the correct range.

If the value of SQN in the AUTN is not in the correct range, the terminal replies with an authentication failure message, the authentication failure message carrying a failure cause parameter "CAUSE" which is "Sync Failure". In particular, the message further carries an authentication failure parameter, that is, an AUTS parameter, which is a value generated by the terminal in cases where a SQN synchronization failure occurs, $AUTS = (SQN_{MS} \oplus f5*K(RAND)) \| MAC-S$, where $MAC-S = f1*K(SQN_{MS} \| RAND \| AMF)$.

In this operation, $\oplus$ is XOR operation, $\|$ represents a splicing operation, XMAC is an expected MAC, and F1K, F2K and F5K are key derived functions taking a root key K as the key. The F1k and the F2k are message authentication functions, and F5k is a key generating function.

At S903, the authentication function receives the authentication failure message from the terminal, and reads the failure cause parameter "CAUSE" in the authentication failure message. If the "CAUSE" is "MAC Failure", then the authentication function can terminate the authentication procedure, or send a terminal identity request message to the terminal, or send an authentication request message to the authentication service function/the subscription data management function, the authentication request message carrying a terminal identity parameter. In particular, the authentication failure message does not carry the AUTS parameter.

If the "CAUSE" is "Sync Failure", then the authentication function sends the authentication request message to the authentication service function/the subscription data management function, the authentication request message carrying the terminal identity parameter. In particular, the message further carries a synchronization failure indicator and the AUTS parameter. The AUTS parameter is the AUTS parameter carried in the authentication failure message received from the terminal.

At S904, the authentication service function/the subscription data management function receives the authentication request message from the authentication function. If the authentication request message includes the synchronization failure indicator, the authentication service function/the subscription data management function performs a resynchronization procedure (which uses the AUTS parameter), and then generates and sends back an authentication response message to the authentication function. If the message does not include the synchronization failure indicator, the authentication service function/the subscription data management function generates and sends back the authentication response message to the authentication function.

At S905, the authentication function receives the authentication response message from the authentication service function/the subscription data management function, and may initiate the authentication procedure for the terminal again.

Eleventh Embodiment

If an attacker replays a valid authentication request message, the attacker can obtain an authentication failure message replied by the terminal after the processing of S902 in the tenth embodiment. By analyzing the cause of failure in the authentication failure message, and replaying the authentication request message multiple times and receiving and analyzing the authentication failure message, the attacker can realize the tracking of the user, and can use the tracking result to further attack the users' privacy. Considering the problem, the present embodiment provides an improved authentication processing method in the authentication procedure of the terminal.

Figure 10:
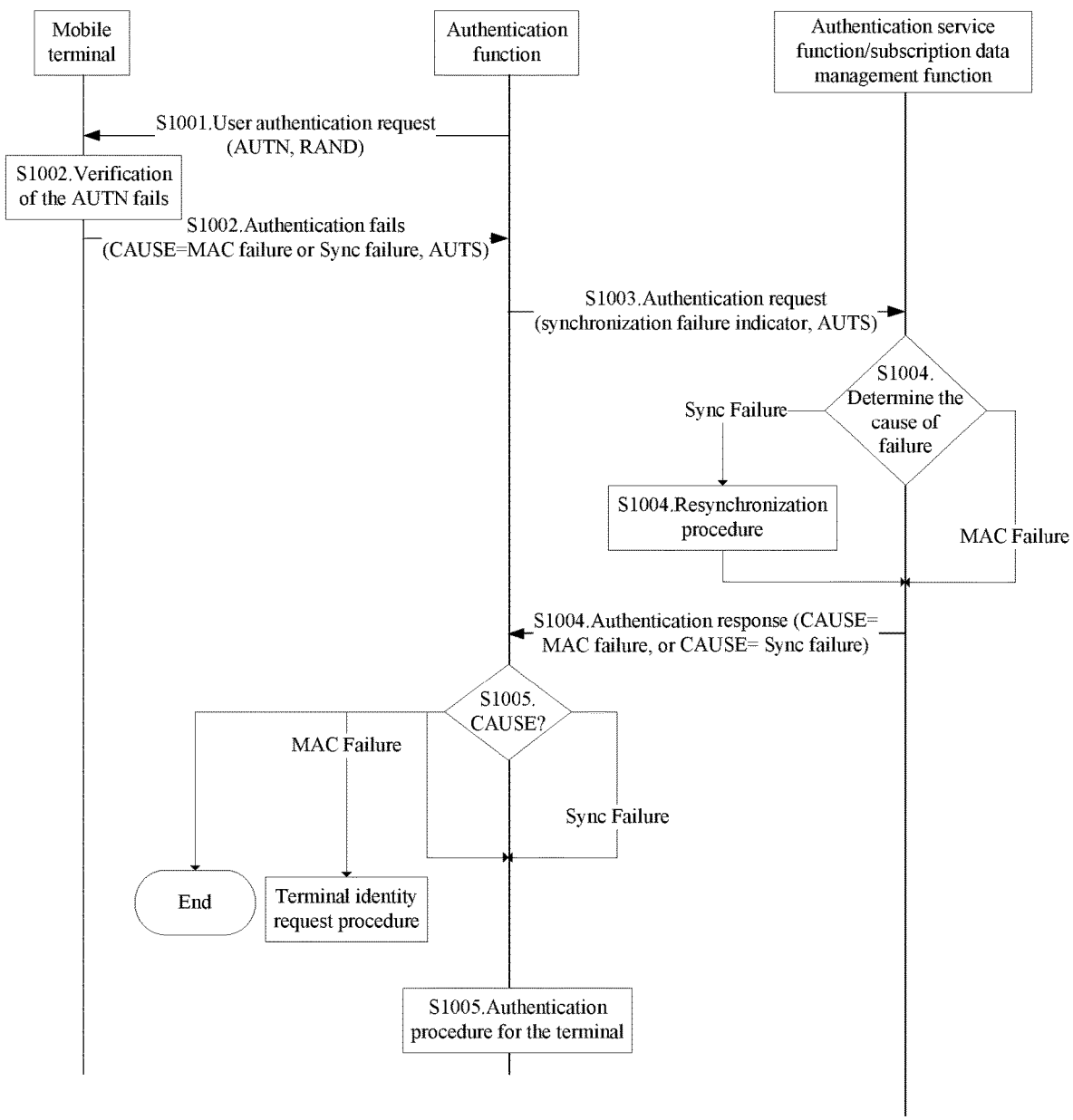
FIG. 10 is a schematic diagram of a security authentication procedure according to an eleventh embodiment of the present application.

FIG. 10 is a schematic diagram of a security authentication procedure according to the eleventh embodiment of the present application. The procedure includes the following operations.

At S1001, the authentication function sends a user authentication request message to the terminal, the user authentication request message carrying AUTN and RAND, where $AUTN = (SQN \oplus AK) \| AMF \| MAC$, and further carrying the ngKSI.

At S1002, the terminal receives the user authentication request message, calculates AK=F5K(RAND), and thus calculates SQN=(SQN⊕AK)⊕AK. Then, the terminal calculates XMAC=F1K(SQN||RAND||AMF), and compares XMAC with MAC in the AUTN. If the XMAC and the MAC are different, the terminal replies the authentication function with an authentication failure message.

If the XMAC and the MAC are the same, the terminal verifies whether the value of SQN in the AUTN is in the correct range. In particular, if the SQN in the AUTN is greater than the $SQN_{MS}$ of the terminal, it is considered that the value is in the correct range; or else, the terminal replies the authentication function with the authentication failure message.

When both types of authentication fail, the terminal replies the authentication function with the authentication failure message. The message carries a failure cause parameter "CAUSE" which is "MAC or Sync Failure", and the message further carries the AUTS parameter, AUTS= ($SQN_{MS}$ ⊕f5*K(RAND))||MAC-S, where MAC-S=f1*K ($SQN_{MS}$||RAND||AMF). In the case of MAC authentication failure, the AUTS parameter carried may also be other values with the same length, for example, random numbers.

At S1003, the authentication function receives the authentication failure message from the terminal and reads the failure cause parameter "CAUSE" in the authentication failure message. If "CAUSE" is "MAC or Sync Failure", then the authentication function sends the authentication request message to the authentication service function/the subscription data management function, the authentication request message carrying the terminal identity parameter. In particular, the authentication request message further carries a synchronization or MAC failure indicator ("Sync or MAC failure indicator") and the AUTS parameter. The AUTS parameter is the AUTS parameter carried in the authentication failure message received from the terminal.

At S1004, the authentication service function/the subscription data management function receives the authentication request message from the authentication function. If the message includes the synchronization or MAC failure indicator ("Sync or MAC failure indicator"), the authentication service function/the subscription data management function calculates the $SQN_{MS}$ according to the AUTS, and determines the cause of failure by comparing the $SQN_{MS}$ with the $SQN_{HE}$.

For example, when the $SQN_{MS}$ is greater than or equal to the $SQN_{HE}$, it is determined that the cause of failure is "Sync Failure"; when the $SQN_{MS}$ is less than the $SQN_{HE}$, or when verification of the AUTS fails, it is determined that the cause of failure is "MAC Failure".

If the cause of failure is "Sync Failure", the resynchronization procedure is performed (the resynchronization procedure uses the AUTS parameter), and the authentication response message is generated and sent back to the authentication function, the authentication response message carrying the failure cause parameter "CAUSE" which is "Sync Failure". If the cause of failure is "MAC Failure", the authentication response message is generated and sent back to the authentication function, the authentication response message carrying the failure cause parameter "CAUSE" which is "MAC Failure".

At S1005, the authentication function receives the authentication response message from the authentication service function/the subscription data management function, and reads the failure cause parameter "CAUSE" in the message.

If the "CAUSE" is "MAC Failure", the authentication function can terminate the authentication procedure, or send the terminal identity request message to the terminal, or initiate the authentication procedure for the terminal again.

If the "CAUSE" is "Sync Failure", the authentication function initiates the authentication procedure for the terminal again.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. An authentication processing method, comprising:
   receiving, by a terminal, an authentication request message from an authentication function; and
   in a case where authentication on the authentication request message fails, feeding back, by the terminal, an authentication failure message to the authentication function, wherein in a case where a cause of authentication failure is a Message Authentication Code (MAC) failure and in cases where a cause of authentication failure is a Synchronization (Sync) failure, the terminal feeds back authentication failure messages of the same type to the authentication function;
   wherein in the case where the cause of the authentication failure is the MAC failure and in the case where the cause of the authentication failure is the Sync failure, the terminal feeds back the authentication failure messages of the same type to the authentication function, comprising:
   in the case where the cause of the authentication failure is the MAC failure and in the case where the cause of the authentication failure is the Sync failure, the authentication failure messages do not carrying a failure cause parameter, or all carry the same failure cause parameter.

2. The method according to claim 1, wherein the authentication failure messages all carry the same failure cause parameter, comprising one of the following:
   the authentication failure messages all carry the failure cause parameter which is set to null or has a same preset padding value;
   the authentication failure messages all carry the failure cause parameter which is Message Authentication Code or Synchronization (MAC or Sync) Failure; or
   the authentication failure messages all carry the failure cause parameter which is Sync Failure.

3. The method according to claim 1, wherein in the case where the cause of the authentication failure is the MAC failure and in the case where the cause of the authentication failure is the Sync failure, the terminal feeds back the authentication failure messages of the same type to the authentication function, comprising:

in the case where the cause of the authentication failure is the MAC failure and in the case where the cause of the authentication failure is the Sync failure, the authentication failure messages all carry a synchronization failure parameter.

4. The method according to claim 3, wherein in the case where the cause of the authentication failure is the Sync failure, the synchronization failure parameter is calculated by the terminal according to the authentication request message;

in the case where the cause of the authentication failure is the MAC failure, the synchronization failure parameter is randomly generated by the terminal, or is a predetermined value, or is calculated by the terminal according to the authentication request message.

5. The method according to claim 4, wherein the data length of the synchronization failure parameter randomly generated by the terminal and the data length of the predetermined value and the data length of the synchronization failure parameter calculated by the terminal according to the authentication request message are the same.

6. An authentication processing device applied to a terminal, comprising a memory storing instructions and a processor in communication with the memory, wherein the processor is configured to execute the instructions to perform the method according to claim 1.

7. A non-transitory computer-readable storage medium, storing a computer program, wherein the computer program is configured to execute, at runtime, the method according to claim 1.

8. An authentication processing method, comprising:
receiving, by an authentication function, an authentication failure message fed back by a terminal, wherein in a case where a cause of authentication failure is a Message Authentication Code (MAC) failure and in a case where a cause of authentication failure is a Synchronization (Sync) failure, authentication failure messages received by the authentication function all carry a synchronization failure parameter;

sending, by the authentication function, an authentication request message to a home network entity, wherein the authentication request message carries the synchronization failure parameter; and receiving, by the authentication function, a cause of failure returned by the home network entity according to the synchronization failure parameter;

wherein in the case where the cause of the authentication failure is the MAC failure and in the case where the cause of the authentication failure is the Sync failure, the authentication failure messages received by the authentication function do not carry a failure cause parameter, or all carry the same failure cause parameter.

9. The method according to claim 8, wherein the authentication failure messages received by the authentication function all carry the same failure cause parameter, comprising one of the following:

the authentication failure messages all carry the failure cause parameter which is set to null or has a same preset padding value;

the authentication failure messages all carry the failure cause parameter which is MAC or Sync Failure; or the authentication failure messages all carry the failure cause parameter which is Sync Failure.

10. The method according to claim 8, further comprising:
adding, by the authentication function, a predetermined failure indicator to the authentication request message, wherein the predetermined failure indicator comprises one of the following:

Sync Failure Indicator; and

MAC or Sync Failure Indicator.

11. An authentication processing device applied to an authentication function, comprising a memory storing instructions and a processor in communication with the memory, wherein the processor is configured to execute the instructions to perform the method according to claim 8.

12. A non-transitory computer-readable storage medium, storing a computer program, wherein the computer program is configured to execute, at runtime, the method according to claim 8.

13. The method according to claim 8, wherein after receiving, by the authentication function, the cause of failure returned by the home network entity according to the synchronization failure parameter, the method further comprises:

performing, by the authentication function, authentication processing according to the cause of failure returned by the home network entity.

14. An authentication processing method, comprising:
receiving, by a home network entity, an authentication request message from an authentication function, wherein the authentication request message carries a synchronization failure parameter generated in the case where a Message Authentication Code (MAC) failure or a Synchronization (Sync) failure occurs while a terminal performs authentication;

determining, by the home network entity, a cause of failure according to the synchronization failure parameter; and returning, by the home network entity, the cause of failure to the authentication function;

wherein in the case where the cause of the authentication failure is the MAC failure and in the case where the cause of the authentication failure is the Sync failure, the terminal feeds back the authentication failure messages of the same type to the authentication function, comprising:

in the case where the cause of the authentication failure is the MAC failure and in the case where the cause of the authentication failure is the Sync failure, the authentication failure messages do not carrying a failure cause parameter, or all carry the same failure cause parameter.

15. The method according to claim 14, wherein determining, by the home network entity, the cause of failure according to the synchronization failure parameter comprises:

verifying, by the home network entity, validity of the synchronization failure parameter;

in the case where the synchronization failure parameter is verified invalid, determining that the cause of failure is the MAC failure; and in the case where the synchronization failure parameter is verified valid, calculating, by the home network entity, a sequence number $SQN_{MS}$ of the terminal according to the synchronization failure parameter, and determining, by the home network entity, the cause of failure according to the sequence number $SQN_{MS}$ of the terminal and a sequence number $SQN_{HE}$ of the home network entity.

16. The method according to claim 15, wherein determining, by the home network entity, the cause of failure according to the sequence number $SQN_{MS}$ of the terminal and the sequence number $SQN_{HE}$ of the home network entity comprises at least one of the following:
- in the case where the $SQN_{MS}$ is greater than or equal to the $SQN_{HE}$, determining, by the home network entity, that the cause of failure is the Sync failure; and
- in the case where the $SQN_{MS}$ is less than the $SQN_{HE}$, determining, by the home network entity, that the cause of failure is the MAC failure.

17. An authentication processing device applied to a home network entity, comprising a memory storing instructions and a processor in communication with the memory, wherein the processor is configured to execute the instructions to perform the method according to claim 14.

18. A non-transitory computer-readable storage medium, storing a computer program, wherein the computer program is configured to execute, at runtime, the method according to claim 14.

* * * * *